United States Patent
Okahara (10) Patent No.: US 7,508,656 B2
(45) Date of Patent: Mar. 24, 2009

(54) DISPLAY DEVICE HAVING HINGES WITH DIFFERENT TORQUE CHARACTERISTICS

(75) Inventor: Hirohide Okahara, Yokohama (JP)

(73) Assignee: Panasonic Corporation, Osaka (JP)

( * ) Notice: Subject to any disclaimer, the term of this patent is extended or adjusted under 35 U.S.C. 154(b) by 572 days.

(21) Appl. No.: 11/252,844

(22) Filed: Oct. 18, 2005

(65) Prior Publication Data

US 2006/0081757 A1 Apr. 20, 2006

(30) Foreign Application Priority Data

Oct. 19, 2004 (JP) ............................. 2004-303749

(51) Int. Cl.
*G06F 1/16* (2006.01)
*H05K 5/00* (2006.01)
*H05K 7/00* (2006.01)
*E05C 17/64* (2006.01)
*E05D 11/08* (2006.01)

(52) U.S. Cl. ........................................ 361/681; 16/337
(58) Field of Classification Search ................. 361/681; 16/337, 338, 340; 248/447
See application file for complete search history.

(56) References Cited

U.S. PATENT DOCUMENTS

| 5,566,048 | A | * | 10/1996 | Esterberg et al. | ............ 361/681 |
| 5,946,055 | A | * | 8/1999 | Rosen | ......................... 348/837 |
| 6,421,878 | B1 | * | 7/2002 | Kaneko et al. | ................. 16/330 |
| 6,665,907 | B1 | * | 12/2003 | Lu | .............................. 16/340 |
| 6,862,779 | B1 | * | 3/2005 | Lu et al. | ......................... 16/340 |
| 2006/0124816 | A1 | * | 6/2006 | Okahara | ....................... 248/324 |

FOREIGN PATENT DOCUMENTS

JP 02-086277 3/1990

* cited by examiner

*Primary Examiner*—Hae Moon Hyeon
(74) *Attorney, Agent, or Firm*—RatnerPrestia (57) ABSTRACT

A display is rotatably supported by a hinge portion as a support mechanism from a storing position to a using range by exceeding a passing range. The hinge portion has first and second torque generating portions for generating torque for resisting the rotating movement of the display. The first and second torque generating portions are constructed so as to generate the torque in the using range and the passing range. Torque characteristics according to a rotating angle of the display in the passing range are differently set in the first and second torque generating portions. The first torque generating portion has first torque characteristics for generating first torque in the passing range and the using range. The second torque generating portion has second torque characteristics in which the torque is gradually increased in the passing range and reaches second torque at the using range.

6 Claims, 10 Drawing Sheets

PRIOR ART

DISPLAY DEVICE HAVING HINGES WITH DIFFERENT TORQUE CHARACTERISTICS

BACKGROUND OF THE INVENTION

1. Field of the Invention

The present invention relates to a display device for rotatably supporting a display.

2. Background Art

There is conventionally a case in which the display is rotatably arranged in a vehicle, etc. For example, JP-A-2-86277 (page 2 and FIG. 2) discloses a display device for rotatably supporting the display by a hinge. In the display device of this literature, a leaf spring is arranged in a hinge shaft. Torque for resisting a rotating movement of the display is generated by biasing force of the leaf spring. This torque becomes holding torque for holding the display in a constant position, and also becomes operation torque for generating a responsive feeling when the display is manually rotated and operated. In the display device of this kind, the display is held by the above holding torque. Accordingly, the angle of the display can be steplessly adjusted.

Figure 10:
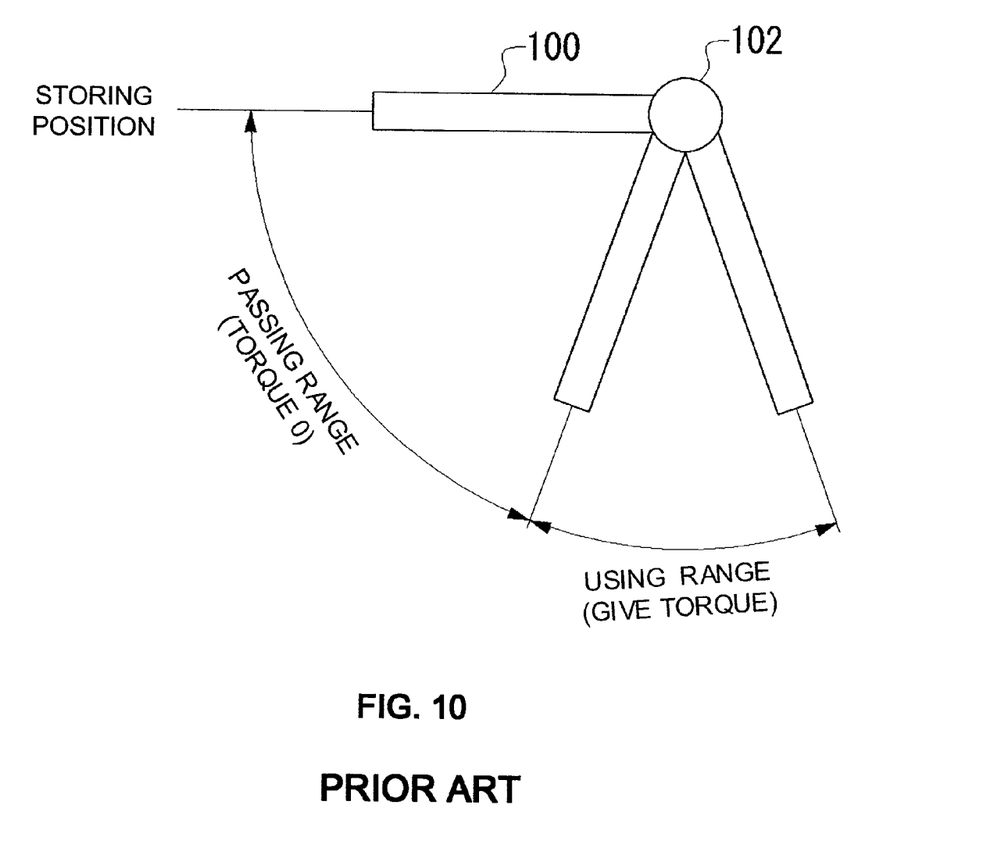
FIG. 10 is a view showing a conventional display device.

FIG. 10 shows an example when the display device is mounted to a ceiling. In FIG. 10, the display 100 is rotatably supported by a hinge 102 from a storing position to a using range through a passing range. The display is directed to the ceiling in the storing position. When a release button is pushed, the display hangs down by its own weight, and reaches the using range through the passing range. In the using range, torque is generated so as to resist the rotating movement of the display. A user manually rotates the display against the torque until a predetermined desirable position. The display is held in a position in which the user separates a user's hand from the display.

When the display is stored, the user manually rotates the display toward the storing position. In the using range, the torque is applied to the display. However, no torque is applied to the display when the display reaches the passing range. When the display reaches the storing position, the display is locked in its position.

When the torque applied to the display is increased in the above description, the holding force is increased. This is advantageous in vibration resisting performance. However, the operation torque is increased and use dignity (quality) is lowered. Conversely, when the torque is reduced, it is advantageous in use dignity, but the vibration resisting performance is lowered. The magnitude of the torque is conventionally adjusted in consideration of such points.

Thus, the magnitude of the torque within the using range is appropriately set in the conventional display device. However, there were the following problems by a torque change (drop difference) on the boundary of the using range and the passing range. The torque change is conventionally large when the display is moved from the using range to the passing range. Therefore, the torque is suddenly reduced during the storing, and the display is forcibly and suddenly closed. This becomes a cause for making the user lowly feel the dignity. Further, when the display is opened, the torque change at the moving time from the passing range to the using range is large. Therefore, a vibration is generated at the tip of the display at a starting end of the using range. This vibration causes the reduction in dignity.

SUMMARY OF THE INVENTION

The present invention is made under the above background, and its object is to provide a display device able to improve the dignity quality at the rotating time.

A display device of one aspect of the present invention comprises: a display; a support mechanism for rotatably supporting the display from a storing position to a using range by exceeding a passing range; and first and second torque generating portions for generating torque for resisting the rotating movement of the display; wherein the first and second torque generating portions are constructed so as to generate the torque in the using range and the passing range, and torque characteristics according to a rotating angle of the display in the passing range are differently set in the first and second torque generating portions.

A display device of another aspect of the present invention comprises: a display; support means for rotatably supporting the display from a storing position to a using range by exceeding a passing range; and first and second torque generating means for generating torque for resisting the rotating movement of the display; wherein the first and second torque generating means are constructed so as to generate the torque in the using range and the passing range, and torque characteristics according to a rotating angle of the display in the passing range are differently set in the first and second torque generating means.

As described hereafter, other aspects of the invention exist. Thus, this summary of the invention is intended to provide a few aspects of the invention and is not intended to limit the scope of the invention described and claimed herein.

BRIEF DESCRIPTION OF THE DRAWINGS

The accompanying drawings are incorporated in and constitute a part of this specification. The drawings exemplify certain aspects of the invention and, together with the description, serve to explain some principles of the invention.

DESCRIPTION OF THE PREFERRED EMBODIMENTS

The following detailed description refers to the accompanying drawings. Although the description includes exemplary implementations, other implementations are possible and changes may be made to the implementations described without departing from the spirit and scope of the invention. The following detailed description and the accompanying drawings do not limit the invention. Instead, the scope of the invention is defined by the appended claims.

This display device comprises: a display; a support mechanism for rotatably supporting the display from a storing position to a using range by exceeding a passing range; and first and second torque generating portions for generating torque for resisting the rotating movement of the display; wherein the first and second torque generating portions are constructed so as to generate the torque in the using range and the passing range, and torque characteristics according to a rotating angle of the display in the passing range are differently set in the first and second torque generating portions.

Appropriate torque can be applied to the display by this construction in the passing range as well as the using range. Thus, the torque change in a transient portion of the using range and the passing range is reduced and a reduction in dignity caused by a sudden torque change can be prevented. Accordingly, the dignity quality at the rotating time can be improved.

The first torque generating portion may have first torque characteristics for generating first torque in the passing range and the using range, and the second torque generating portion may have second torque characteristics in which the torque is gradually increased in the passing range and reaches second torque in the using range.

The torque of a magnitude of a certain degree is generated by this construction from the passing range, and the torque can be smoothly changed in the transient portion of the using range and the passing range. Thus, the dignity at the rotating time can be improved.

The first and second torque generating portions may be respectively arranged in the support mechanism at one end and the other end of the display. Thus, the display device can be made compact by this construction.

Each of the first and second torque generating portions may have a fixing member and a rotating member relatively rotated as the display is rotated, and may also have a biasing member for biasing the fixing member and the rotating member so as to be mutually pressed, and the fixing member or the rotating member may have a convex (or protruding) shape according to the torque characteristics. The display device can be made compact by this construction.

The fixing member may be a bracket for supporting a rotating axis of the display. The display device can be made compact by this construction.

In the present invention, a ceiling mounting type display device is constructed so as to have the above display device and be mounted to a ceiling. The dignity at the rotating time in the ceiling mounting type display device of a vehicle, etc. can be improved by this construction.

The present invention has first and second torque generating means for generating torque for resisting the rotating movement of the display. The first and second torque generating means are constructed so as to generate the torque in the using range and the passing range, and torque characteristics according to a rotating angle of the display in the passing range are differently set in the first and second torque generating means. Thus, the dignity at the rotating time of the display can be improved.

The display device of this embodiment will next be explained by using the drawings.

The display device of the embodiment of the present invention is shown in FIGS. 1 to 9. The entire construction of the display device will first be explained with reference to FIGS. 7 to 9. It is then returned to FIG. 1 and the details of an opening-closing mechanism of the display device will be explained.

Figure 7:
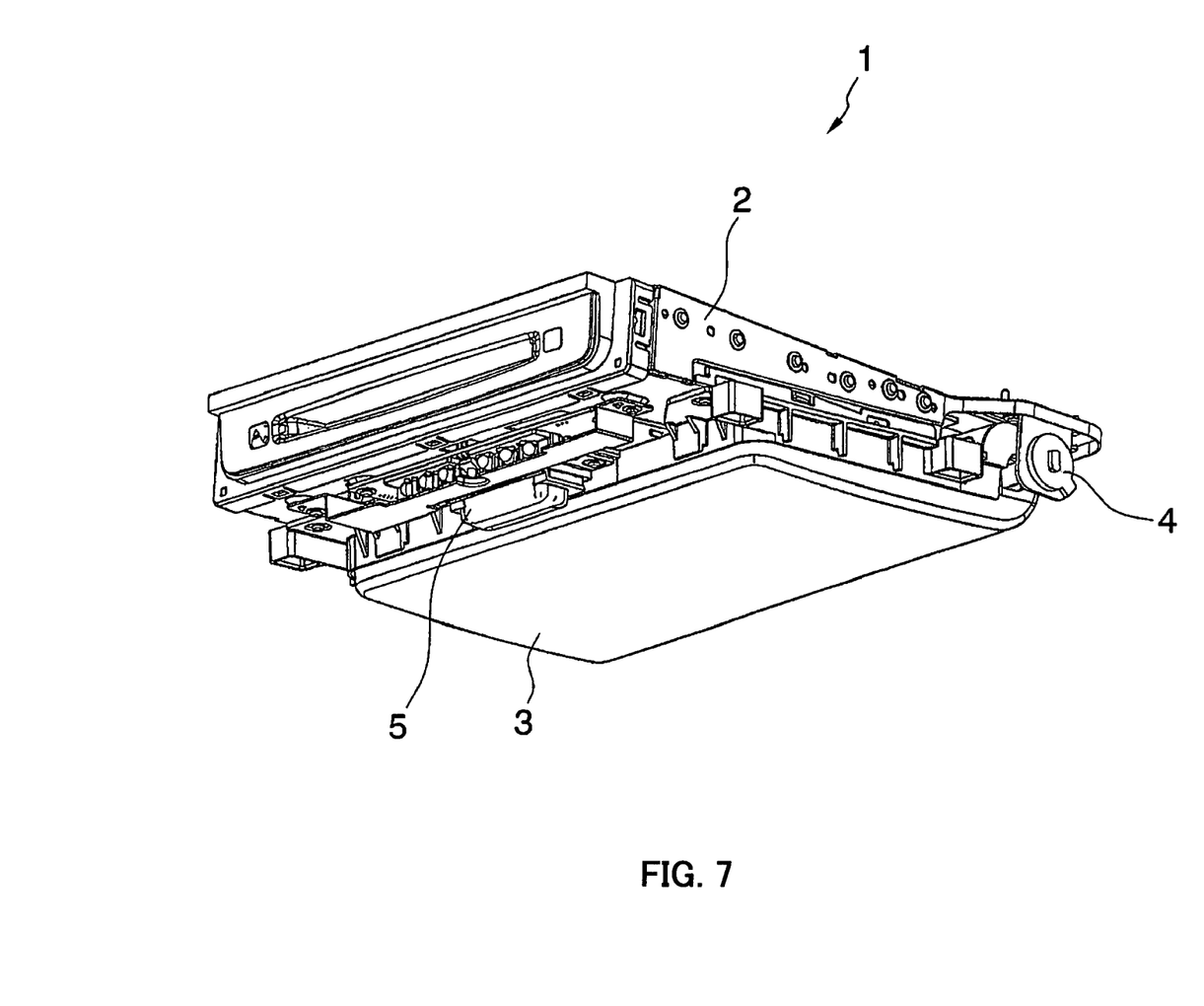
FIG. 7 is a perspective view showing the display device of a closing state.
Figure 8:
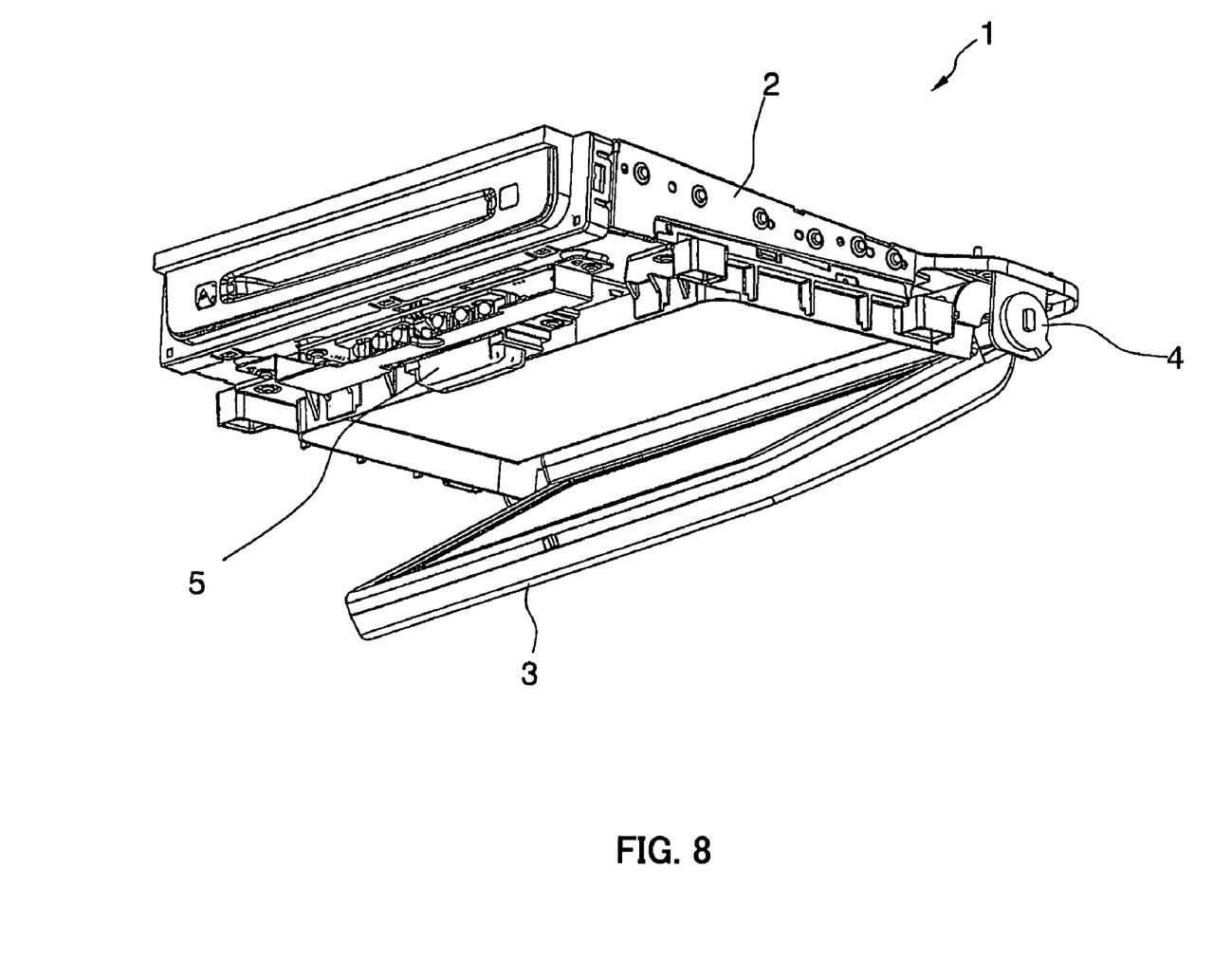
FIG. 8 is a perspective view showing the display device of a semi-opening state.
Figure 9:
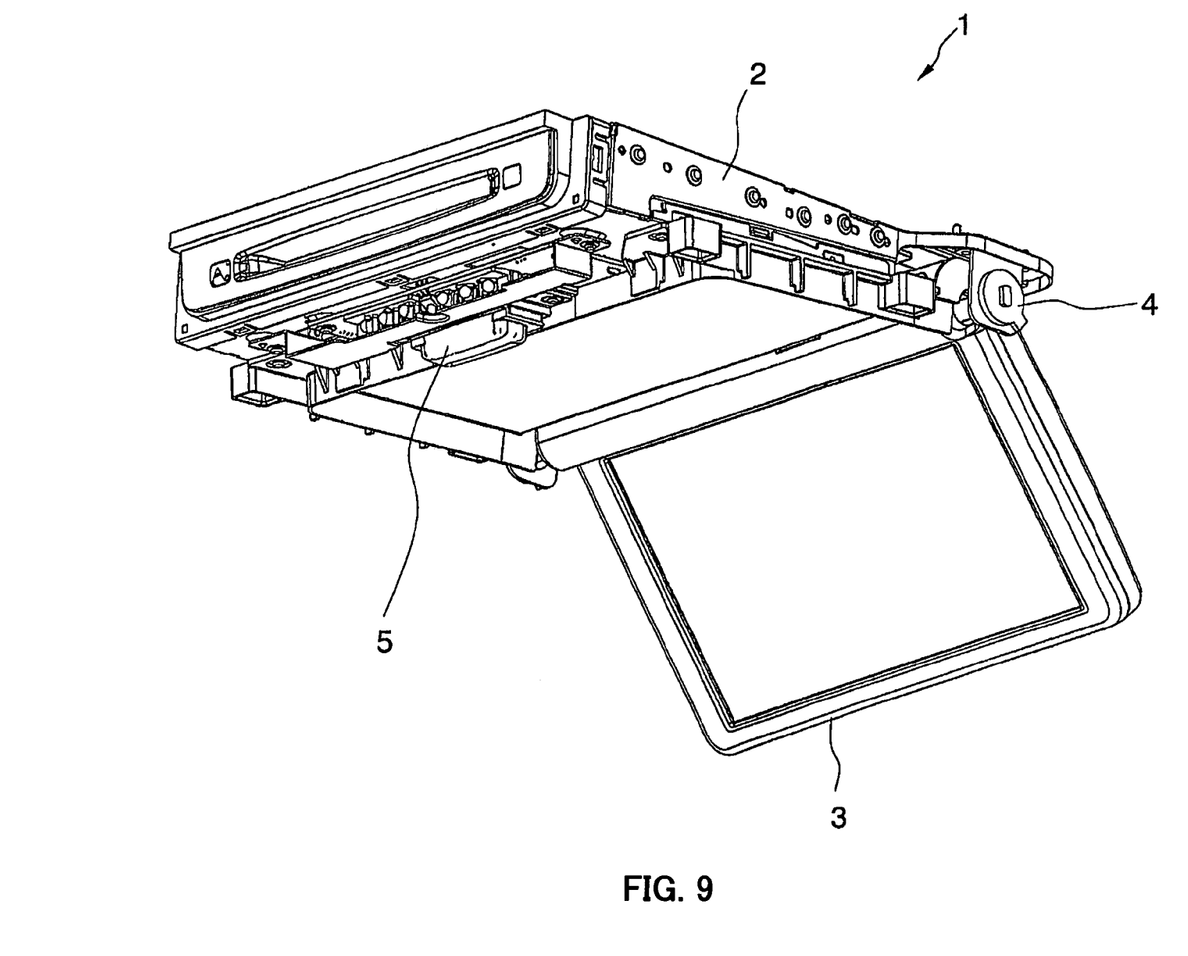
FIG. 9 is a perspective view showing the display device of a full opening state.

FIGS. 7 to 9 show the entire construction of the display device of this embodiment. The display device 1 has a base section 2 and a display 3. The display 3 is a flat display of a liquid crystal, etc., and is rotatably supported in the base section 2 by a hinge portion 4. The hinge portion 4 corresponds to a support mechanism or a support means of the present invention.

The display device 1 of this embodiment is used for a vehicle, and is arranged in the ceiling of a vehicle room in postures shown in FIGS. 7 to 9. In an arranging state, a mechanism portion of the base section 2 is hidden by an inner lining of the ceiling. FIG. 7 shows a full closing state, and FIG. 8 shows a semi-opening state and FIG. 9 shows a full opening state. In the full closing state of FIG. 7, the screen of the display 3 is directed to the ceiling, and the display is located in a storing position. When a release button 5 arranged in the display 3 is pushed, a lock is released and the display 3 can be rotated and opened as shown in FIGS. 8 and 9.

Figure 1:
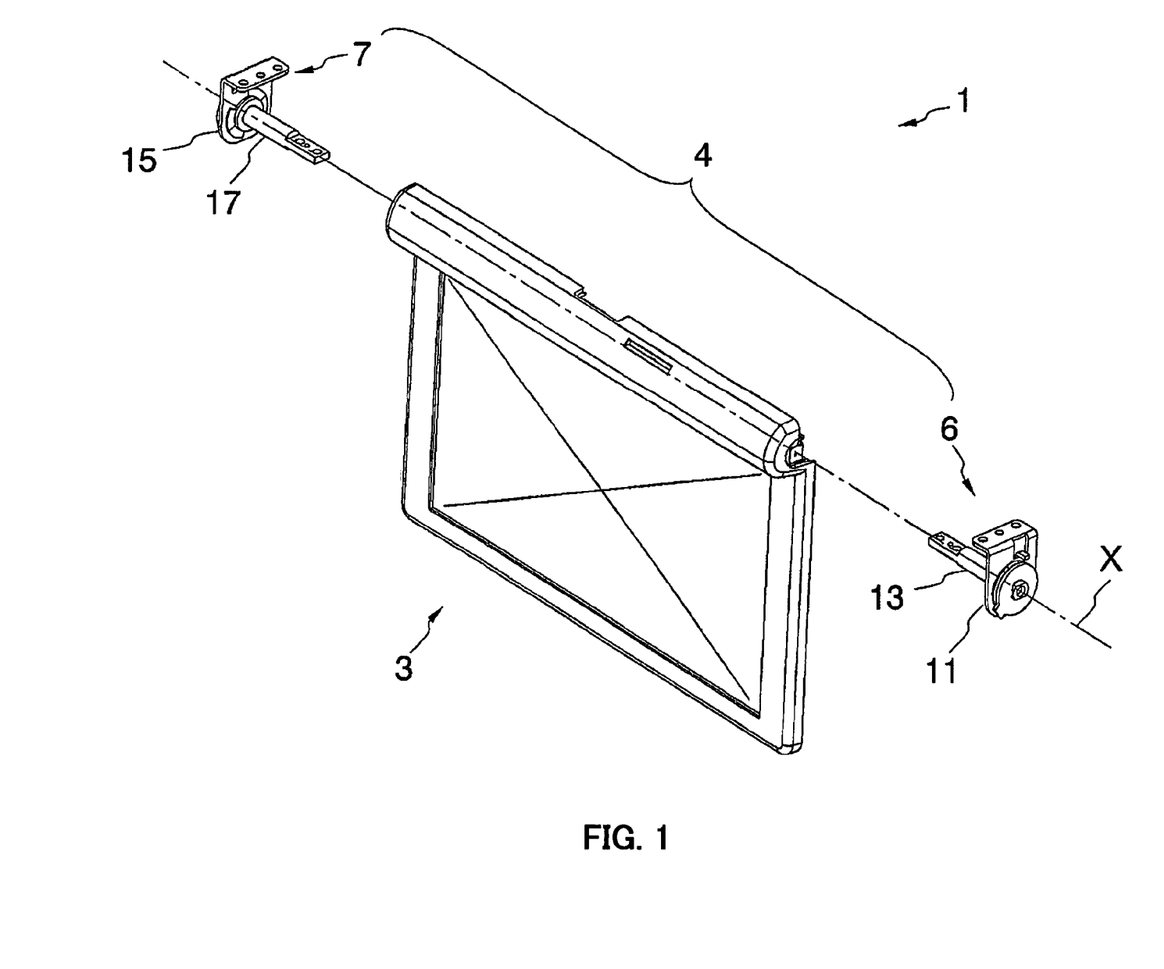
FIG. 1 is an exploded perspective view of a display device in an embodiment of the present invention.

FIG. 1 is an exploded perspective view of the display device 1, and shows the display 3 and the hinge portion 4. The hinge portion 4 is constructed by a right-hand hinge portion 6 and a left-hand hinge portion 7. The right-hand hinge portion 6 and the left-hand hinge portion 7 are respectively arranged on the right and left sides of the display 3.

The right-hand hinge portion 6 has a right-hand bracket 11 fixed to the base section 2, and a right-hand shaft 13 rotatably arranged on the right-hand bracket 11. The right-hand shaft 13 is fixed to a base end portion of the display 3. Similarly, the left-hand hinge portion 7 has a left-hand bracket 15 fixed to the base section 2, and a left-hand shaft 17 rotatably arranged on the left-hand bracket 15. The left-hand shaft 17 is fixed to the base end portion of the display 3. As explained below, the right-hand hinge portion 6 and the left-hand hinge portion 7 are constructed so as to generate torque for resisting a rotating movement of the display 3.

Here, in the following explanation, the side near the center of the display 3 along a rotating axis X is called the inside, and the side far from the center of the display 3 is called the outside.

Figure 2:
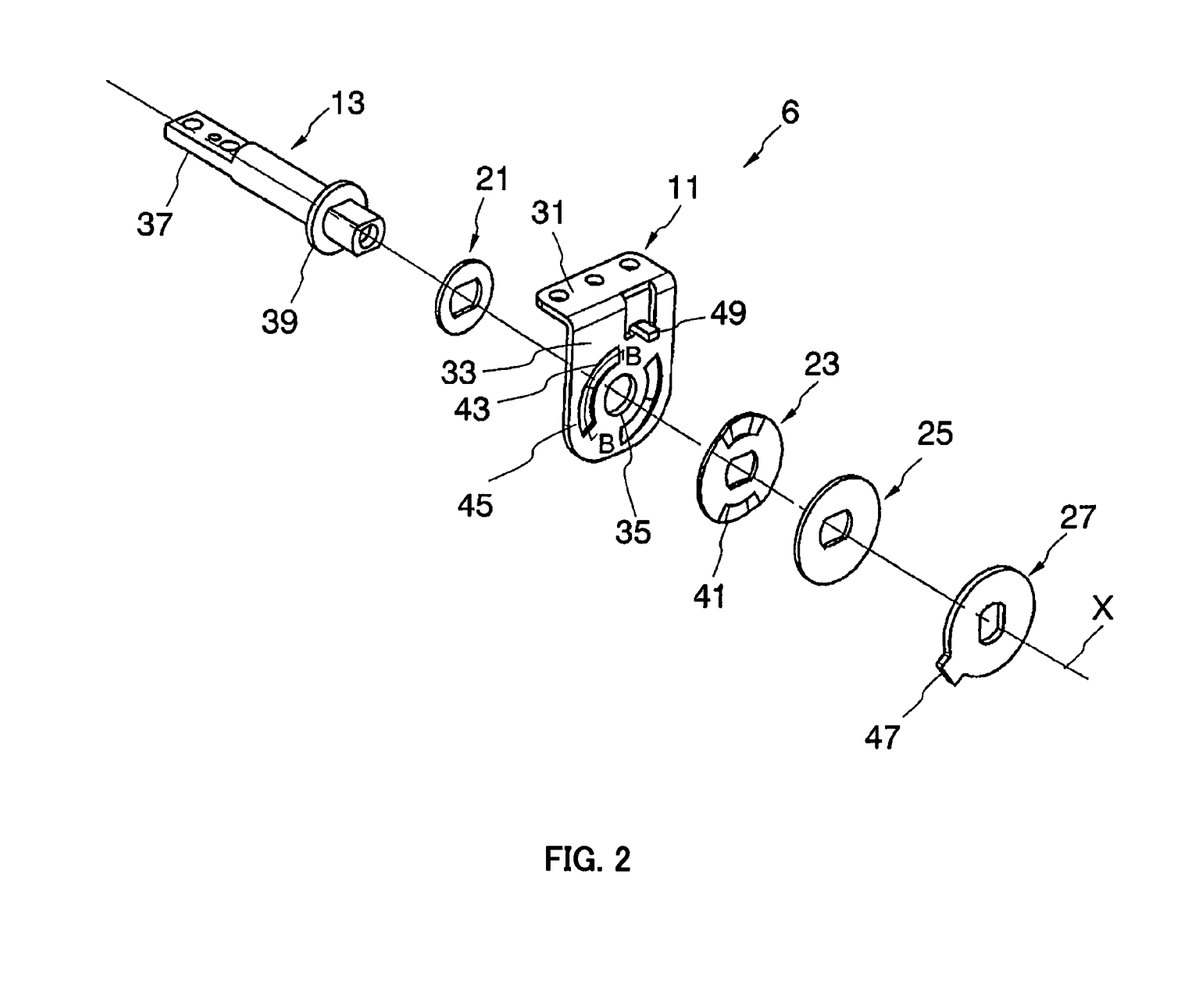
FIG. 2 is an exploded perspective view of a right-hand hinge portion.

FIG. 2 is an exploded perspective view of the right-hand hinge portion 6. The right-hand hinge portion 6 has the right-hand bracket 11, the right-hand shaft 13, a frictional plate 21, a click washer 23, a right-hand spring plate 25 and a flat washer 27, and these members are manufactured by iron.

The right-hand bracket 11 has an attaching portion 31 fixed to the unillustrated base section, and a wall portion 33 perpendicular to the attaching portion 31. The right-hand shaft 13 is inserted into a hole 35 of the wall portion 33 so that the right-hand shaft 13 is rotatably supported. Namely, the hole 35 of the wall portion 33 functions as a bearing of the right-hand shaft 13.

The right-hand shaft 13 is fixed to the display 3 by an attaching portion 37 at its inside end. A flange 39 is arranged near the outside end of the right-hand shaft 13. In a state in which the right-hand shaft 13 is inserted into the hole 35 of the right-hand bracket 11, the frictional plate 21 is sandwiched by the flange 39 and the wall portion 33 of the bracket 11.

The frictional plate 21 has a disk shape and the right-hand shaft 13 is inserted into a central hole of this frictional plate 21. The central hole of the frictional plate 21 has a shape engaged with the right-hand shaft 13. More particularly, two parallel straight line portions are arranged in the central hole, and are engaged with two parallel planes of an end portion of the right-hand shaft 13. Thus, the frictional plate 21 is engaged with the right-hand shaft 13, and is rotated together with the right-hand shaft 13 and is slid with respect to the bracket 11.

An outside end portion of the right-hand shaft 13 is extended through the right-hand bracket 11 and is projected. The click washer 23, the right-hand spring plate 25 and the flat washer 27 are sequentially fitted into the projected portion. The click washer 23, the right-hand spring plate 25 and the flat washer 27 have a disk shape. Similar to the frictional plate 21, the right-hand shaft 13 is inserted and engaged with the central holes of the click washer 23 the right-hand spring plate 25 and the flat washer 27. Thus, the click washer 23, the right-hand spring plate 25 and the flat washer 27 are also rotated together with the right-hand shaft 13.

Convex (protruding) portions 41 are arranged in two places of edge portions in the click washer 23. The convex portion 41 is directed to the inside. Namely, the convex portion 41 is projected in the direction of the right-hand bracket 11. The convex portions 41 of the two places are located on the opposite side through the rotating axis X.

The right-hand bracket 11 has taper portions 43 and bank portions 45 continued to this taper portions 43 (convex portion or protruding portion) in a position corresponding to the convex portions 41 of the click washer 23. The taper portion 43 and the bank portion 45 draw an arc with the rotating axis X as a center. The bank portion 45 is projected outside from the circumferential wall portion 33, and the taper portion 43 smoothly connects from the wall portion 33 to the top portion of the bank portion 45.

The spring plate 25 is a leaf spring and biases the click washer 23 toward the right-hand bracket 11. Thus, the click washer 23 is pressed against the right-hand bracket 11.

The convex portion 41 of the click washer 23 is pressed to the right-hand bracket 11 by the above construction. This pressing force causes torque for resisting the rotating movement of the display 3. The magnitude of the torque is changed as the display is rotated. When the display is rotated, the convex portion 41 climbs the taper portion 43. As the convex portion 41 climbs the taper portion 43, the click washer 23 is moved outside and the right-hand spring plate 25 is greatly deformed so that the torque is also increased. When the convex portion 41 reaches the bank portion 45, the deformation of the right-hand spring plate 25 becomes maximum and the torque becomes maximum.

The flat washer 27 fulfills a function for pressing the spring plate 25 and the click washer 23. Further, the flat washer 27 has a projecting portion 47 of a radial direction. When the display 3 is rotated until the end of the using range, the projecting portion 47 hits against a stopper 49 arranged in the bracket 11. Thus, the rotating movement of the display is regulated.

Figure 3:
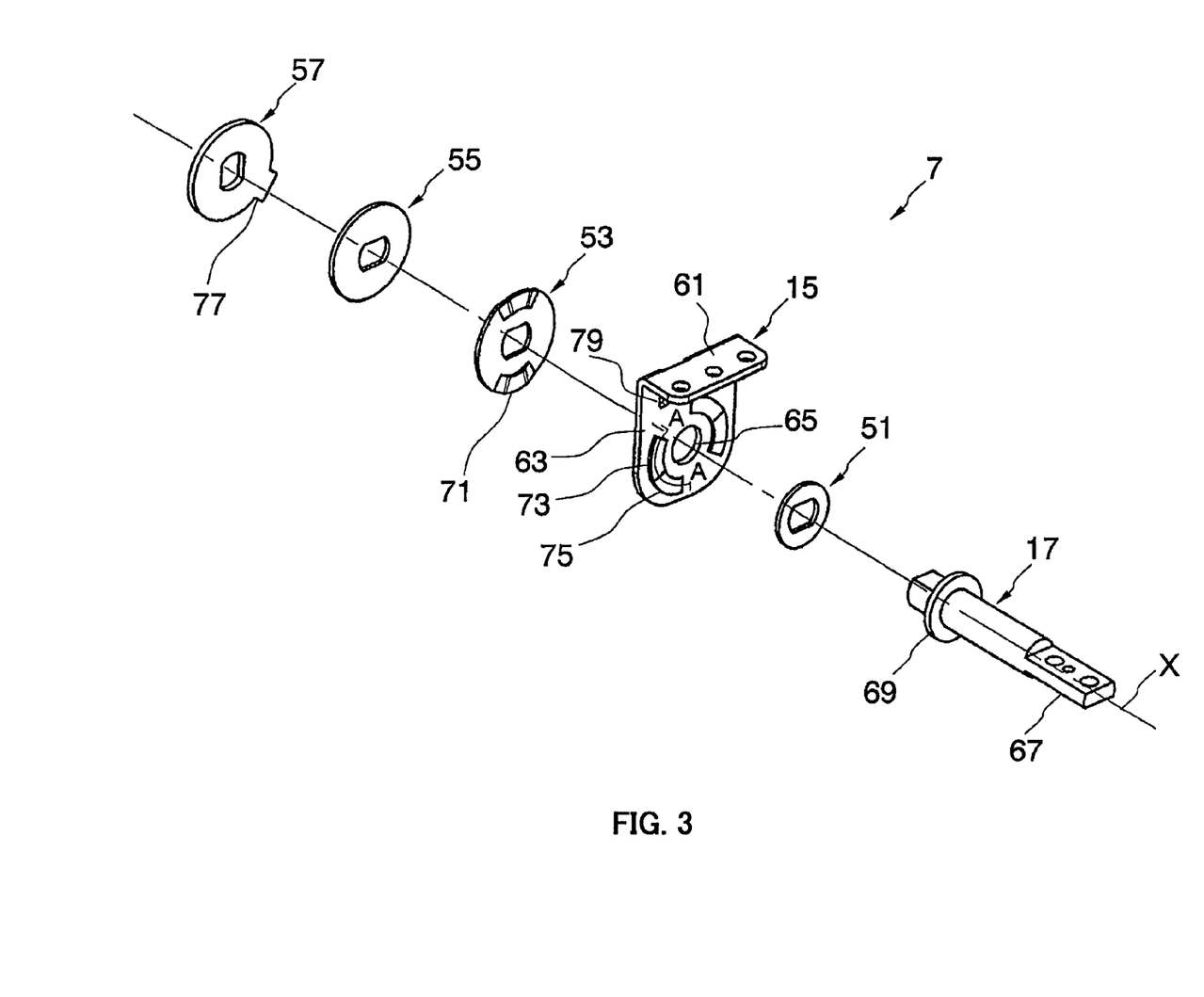
FIG. 3 is an exploded perspective view of a left-hand hinge portion.

FIG. 3 is an exploded perspective view of the left-hand hinge portion 7. The left-hand hinge portion 7 has the left-hand bracket 15, the left-hand shaft 17, a frictional plate 51, a click washer 53, a left-hand spring plate 55 and a flat washer 57.

The basic construction of the left-hand hinge portion 7 is similar to that of the right-hand hinge portion 6, and its detailed explanation is therefore omitted. Similar to the right-hand hinge portion 6, in the left-hand hinge portion 7, the left-hand bracket 15 schematically has an attaching portion 61 and a wall portion 63. The left-hand shaft 17 is pivotally mounted to a hole 65 of the wall portion 63. The frictional plate 51 is sandwiched between a flange portion 69 of the left-hand shaft 17 and the left-hand bracket 15. The left-hand shaft 17 is extended through the left-hand bracket 15. The click washer 53, the left-hand spring plate 55 and the flat washer 57 are sequentially fitted into the extended and projected portion. Convex portions 71 are arranged in the click washer 53, and taper portions 73 and bank portions 75 (convex portion) are arranged in the left-hand bracket 15. The click washer 53 is biased by the left-hand spring plate 55, and the convex portions 71 abuts on the taper portions 73 and the bank portions 75. Thus, torque is generated so as to resist the rotating movement of the display 3. Further, a projecting portion 77 is arranged in the flat washer 57 and a stopper 79 is arranged in the left-hand bracket 15.

The above right-hand hinge portion 6 and left-hand hinge portion 7 differ from each other in the taper portions of the bracket and the shape of the bank portions. The shapes of the taper portions and the bank portions of both the hinge portions will next be explained in detail.

Figure 4:
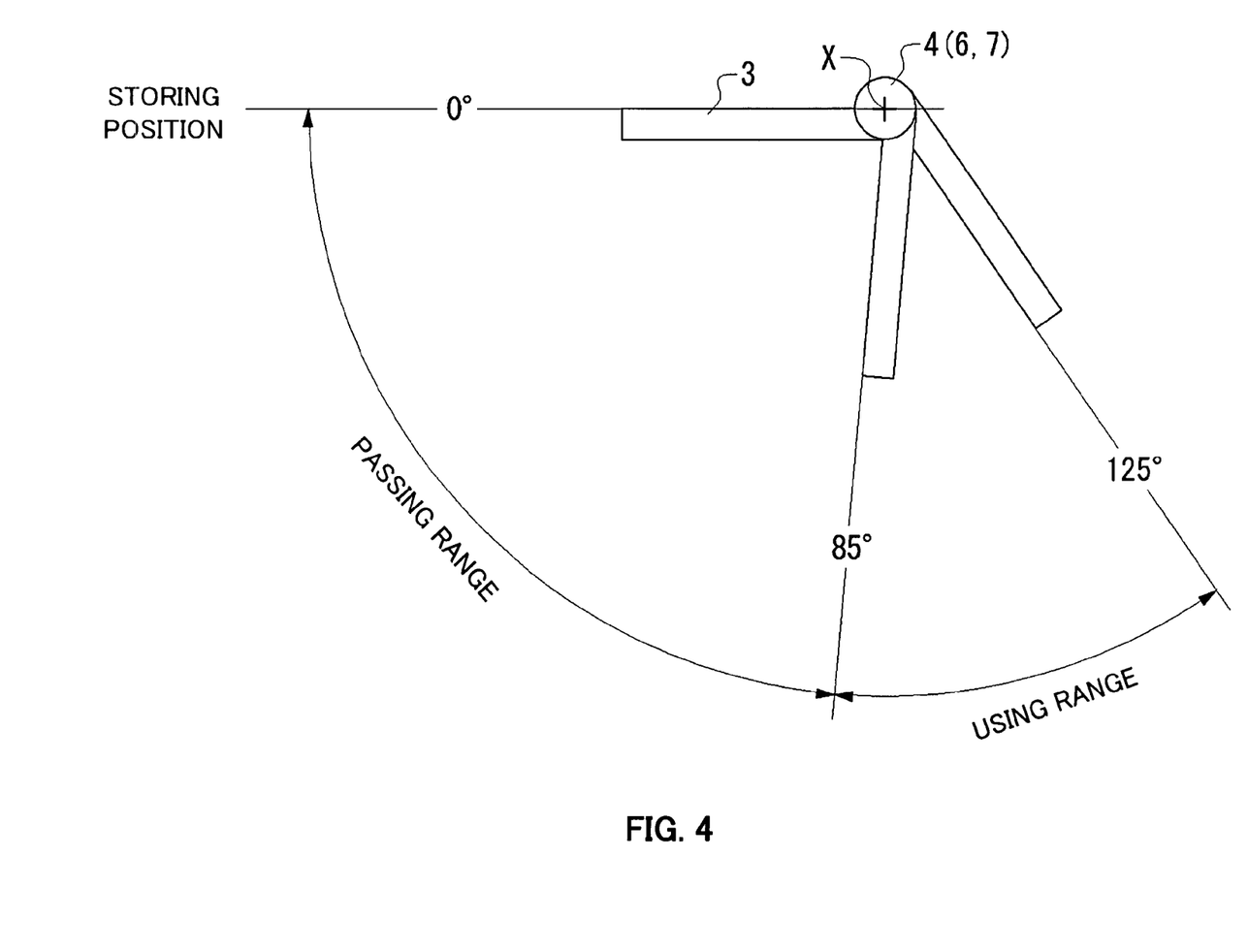
FIG. 4 is a view showing angular setting of a using range of the display device.

First, the setting of the using range of the display 3 will be explained with reference to FIG. 4. As shown in FIG. 4, the display 3 is rotated from the storing position to the using range through the passing range. The storing position corresponds to the closing state of FIG. 7. The display 3 is horizontal in the storing position. In the following description, the angle of the display in the storing position is set to 0 degree. The using range is set so as to easily see the screen by a user in consideration of the dispersions of a body type and a posture of the user. For example, the using range is set to 85 degrees to 125 degrees. The display device 1 of this embodiment is set to a so-called free stop type. When the display 3 of the free stop type is used, the display 3 is rotated until the using range and is held in an arbitrary position within the using range.

Figure 5:
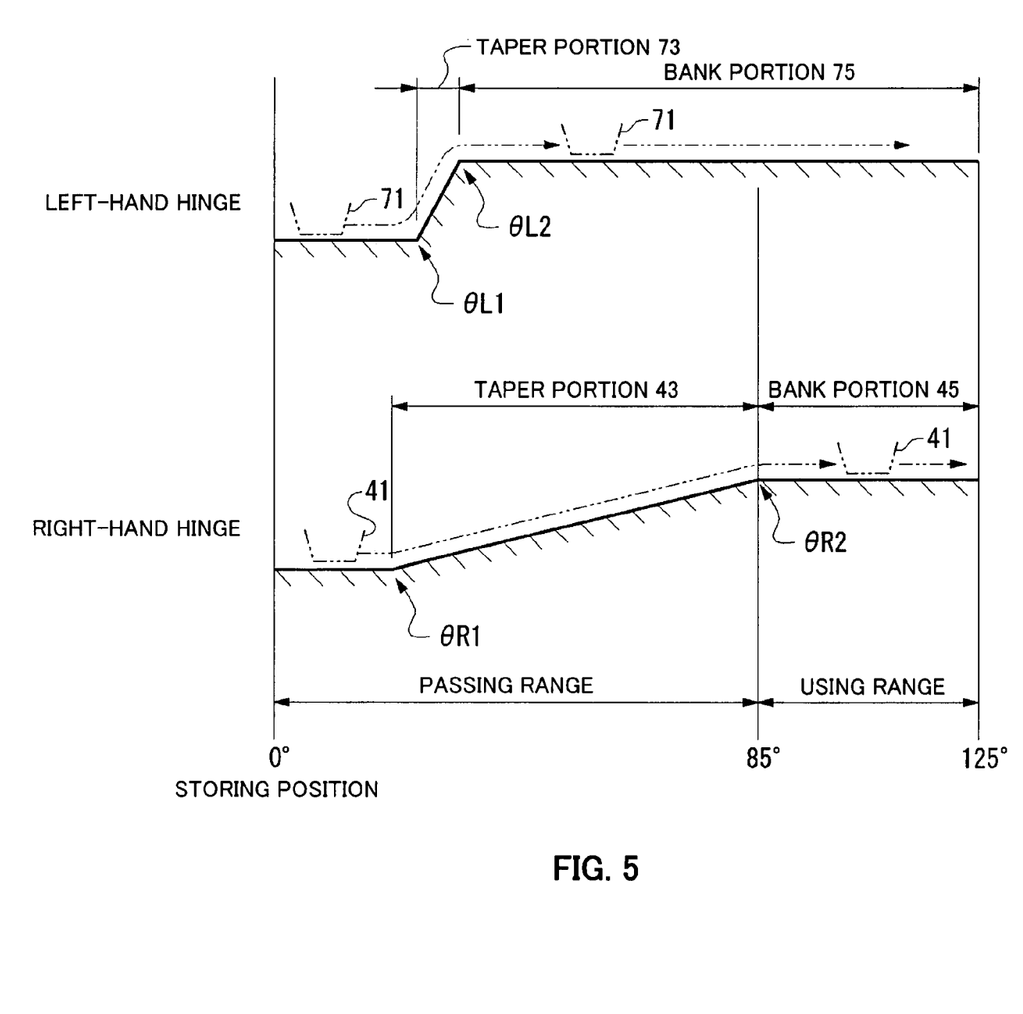
FIG. 5 is a view showing the sectional shape of a bracket of the hinge portions.

FIG. 5 shows the shapes of the taper portions and the bank portions of the brackets of both the hinge portions. An upper half portion of FIG. 5 is a sectional typical view in which the left-hand bracket 15 of the left-hand hinge portion 7 is cut on line A-A of FIG. 3. Accordingly, the upper half portion of FIG. 5 shows a sectional shape when the left-hand bracket 15 is cut along the taper portion 73 and the bank portion 75. Similarly, a lower half portion of FIG. 5 is a sectional typical view in which the right-hand bracket 11 of the right-hand hinge portion 6 is cut on line B-B of FIG. 2. Accordingly, the lower half portion of FIG. 5 shows a sectional shape when the right-hand bracket 11 is cut along the taper portion 43 and the bank portion 45. The sectional shapes of both the hinge portions are aligned in position with the display rotating angle as a reference.

FIG. 5 is typically shown so as to easily understand a change in the shape of the bracket in its thickness direction. Further, FIG. 5 shows convex portions 41, 71 of the click washer abutting on the bracket by phantom lines.

As shown in the upper half portion of FIG. 5, the taper portion 73 is started in the left-hand hinge portion 7 at a rotating angle $\theta L1$ within the passing range. The taper portion 73 is terminated at a rotating angle $\theta L2$ within the passing range. The bank portion 75 is started at the rotating angle $\theta L2$. The bank portion 75 is continued until the terminal of the using range. The rotating angles $\theta L1$, $\theta L2$ are set to comparatively small values within the passing range. For example, $\theta L1=25$ degrees and $\theta L2=32$ degrees are set. Thus, the taper portion 73 is short in the left-hand hinge portion 7. The bank portion 75 is long and is arranged over the using range from the passing range.

On the other hand, as shown in the lower half portion of FIG. 5, the taper portion 43 is started in the right-hand hinge portion 6 at a rotating angle $\theta R1$ within the passing range. The taper portion 43 is terminated at a rotating angle $\theta R2$. The rotating angle $\theta R2$ is set to the boundary of the passing range and the using range. Accordingly, the bank portion 45 is started from a starting end of the using range, and is continued until the terminal of the using range. The rotating angle θR1 is set to a comparatively small value within the passing range. For example, θR1=20 degrees is set. The rotating angle θR2 is set to the boundary of the passing range and the using range as mentioned above. In this embodiment, for example, the rotating angle θR2 is set to 85 degrees. Thus, in the right-hand hinge portion 6, the taper portion 43 is long and is continued until the end of the passing range. The bank portion 45 is arranged in the using range.

The torque characteristics of both the hinge portions correspond to the above bracket shape. As the convex portions 41, 71 of the click washer are located in higher positions of the bracket in FIG. 5, the convex portion (phantom line) of the click washer is more greatly pushed up, and the biasing force of the spring plate is more increased and torque is increased. Accordingly, when the display is rotated and the rotating angle is increased, the torque is increased in the taper portion and becomes maximum in the bank portion. The spring plate functions as a biasing member or a biasing means of the present invention.

Figure 6:
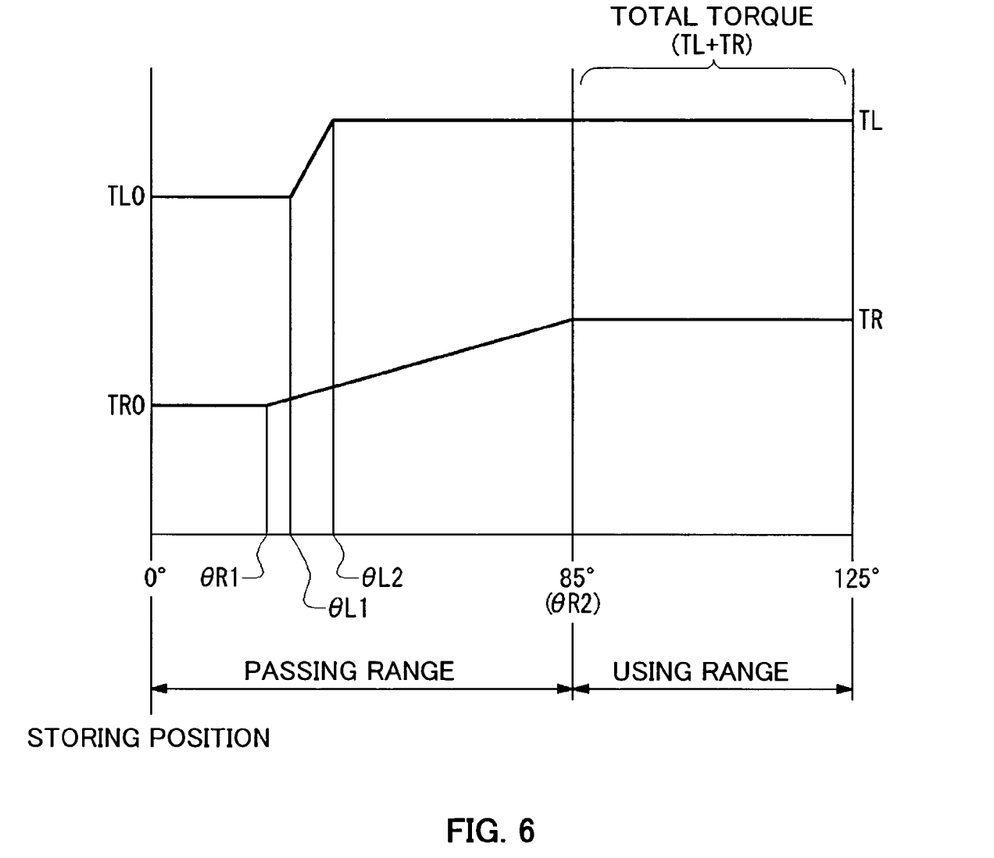
FIG. 6 is a view showing torque characteristics of the left-hand hinge portion and the right-hand hinge portion.

FIG. 6 concretely shows the torque characteristics of the above left-hand hinge portion 7 and right-hand hinge portion 6. The torque characteristics correspond to the bracket shape as mentioned above. Accordingly, in the left-hand hinge portion 7, high torque TL is generated at an initial stage. More particularly, high torque TL is generated in the storing position at the rotating angle θL2 close to the storing position, and constant torque TL is generated from the rotating angle θL2 to the terminal of the using range.

On the other hand, the right-hand hinge portion 6 has a phase difference of a torque generating part with respect to the left-hand hinge portion 7. In the right-hand hinge portion 6, the torque is gradually increased from the rotating angle θR1 to the rotating angle θR2. Namely, the torque is gradually increased within the passing range. When the display enters the using range, the torque reaches predetermined torque TR. Constant torque TR is generated in the using range.

In accordance with the above torque characteristics, when the display enters the using range, a total value (TL+TR) of the torques of both the hinges is generated as total torque. This total torque is torque required in the using range. This total torque becomes holding torque for holding the display in a constant position. Further, this total torque becomes operation torque for generating a moderate manual response when the display is manually rotated within the using range. The torques TL, TR of both the hinges are set such that the total torque becomes a suitable value as the holding torque and the operation torque.

In this embodiment, the biasing force of the left-hand spring plate 55 of the left-hand hinge portion 7 is set so as to be greater than the biasing force of the right-hand spring plate 25 of the right-hand hinge portion 6. Thus, the torque TL of the left-hand hinge portion 7 is set so as to be greater than the torque TR of the right-hand hinge portion 6. Accordingly, the torque of the right-hand hinge portion 6 as gradually increased torque is weakly set. However, both the torques TL, TR may be equally set within the extent of the present invention.

In accordance with the above torque characteristics, high torque TL is generated from the passing range in the left-hand hinge portion 7. On the other hand, in the right-hand hinge portion 6, the torque is gradually increased in the passing range and reaches TR in the using range. Accordingly, when it is seen as the entire hinge, the torque of a magnitude of a certain extent is generated from the initial stage in the passing range, and is gradually increased. The above total torque (torque required in the using range) is generated at the end of the passing range. Thus, moderate torque is generated in the passing range and the torque change in a transient portion of the passing range and the using range is reduced.

In FIG. 5, initial torques TL0, TR0 near the storing position are set to 0 (zero) or a value close to zero. The shapes of the bracket, the washer, the spring, etc. are set so as to obtain such torques TL0, TR0.

The construction of the display device 1 of this embodiment has been explained together with the details of the torque characteristics of both the hinge portions as mentioned above. The operation of the display device 1 of this embodiment will next be explained.

The operation performed at an opening time of the display 3 will first be explained. When a button 5 (see FIG. 7) of the display device 1 is pushed, the lock of the display 3 is released and the display 3 can be rotated with the rotating axis of the hinge portion 4 as a center. The tip of the display 3 is lowered to a certain extent by the action of its own weight. The tip of the display 3 is manually pushed down by a user and the display 3 is further rotated. In FIG. 4, the display 3 is started from the storing position and exceeds the passing range and reaches the using range. The display 3 is held in a position located when the user separates a user's hand from the display 3.

In the above process, torque is generated in accordance with the torque characteristics of FIG. 5 in the left-hand hinge portion 7 and the right-hand hinge portion 6. In the left-hand hinge portion 7, torque TL is generated from the rotating angle θL2 of the passing range. On the other hand, in the right-hand hinge portion 6, the torque is gradually increased in the passing range, and torque TR is generated at the rotating angle θR2, i.e., at the starting end of the using range. In the using range, total torque TL+TR is generated. Accordingly, the torque change in the transient portion entering the using range from the passing range is small so that dignity quality can be improved.

Here, the prior art and this embodiment will be compared. In the prior art, in the entire passing range, the torque is small torque set to such an extent that this torque is not influenced by a torque rising amount caused by an increase in grease resistance load at a low temperature time. Accordingly, the torque drop difference between the passing range and the using range was large. Therefore, when the lock of the display is released, the display is lowered by the action of its own weight until the starting end of the using range. At this time, since the torque drop difference is large, impact force is applied to the display and a vibration is generated at the tip of the display. This vibration becomes a factor for reducing dignity. In contrast to this, since torque is not suddenly changed in this embodiment, the generation of the above vibration can be avoided so that dignity quality can be improved.

Next, the operation performed at a closing time of the display 3 will be explained. When the display 3 is closed, the display 3 is pushed by the hand of the user and is rotated and is moved from the using range to the passing range and reaches the storing position through the passing range. When the display 3 reaches the storing position, the lock is automatically operated and the display 3 is locked in the storing position.

In the above process, torque is also generated in accordance with the torque characteristics of FIG. 5 in the left-hand hinge portion 7 and the right-hand hinge portion 6. Namely, in the left-hand hinge portion 7, constant torque TL is continuously generated even when the display 3 is moved from the using range to the passing range. On the other hand, in the right-hand hinge portion 6, when the using range is terminated and the display 3 enters the passing range, the torque is gradually reduced. Accordingly, the torque change at the entering time of the passing range from the using range is small so that dignity at the closing time of the display can be also improved.

Here, the prior art and this embodiment will be again compared. In the prior art, since the torque drop difference between the using range and the passing range is large, the manual response is suddenly reduced while the display is closed. Therefore, the display is suddenly closed with a bang, and the user lowly feels the dignity, which may become a problem. In contrast to this, in this embodiment, torque is not suddenly changed as mentioned above and the manual response feeling at the operating time is gradually changed so that dignity is improved.

The display device 1 in accordance with the embodiment of the present invention has been explained as mentioned above. In this embodiment, first and second torque generating portions of the present invention are respectively arranged in the left-hand hinge portion 7 and the right-hand hinge portion 6. As mentioned above, in accordance with this embodiment, the first and second torque generating portions are constructed so as to generate torque in the using range and the passing range. The torque characteristics according to the rotating angle of the display in the passing range are differently set in the first and second torque generating portions. Thus, appropriate torque can be also applied to the display in the passing range as well as the using range. Thus, the torque change in the transient portion of the using range and the passing range can be reduced and dignity quality at the rotating time can be improved.

Further, in this embodiment, the first torque generating portion (left-hand hinge portion 7) has first torque characteristics for generating the first torque TL in the passing range and the using range. The second torque generating portion (right-hand hinge portion 6) has second torque characteristics in which torque is gradually increased in the passing range and reaches the second torque TR at the using range. Accordingly, the torque of a magnitude of a certain extent from the passing range is generated and the torque can be smoothly changed in the transient portion of the using range and the passing range. Thus, dignity at the rotating time can be improved.

Further, in this embodiment, the torque characteristics can be arbitrarily set by adjusting the slope shape for determining the torque characteristics so as to improve dignity. The slope shape is defined by the angle and/or range of the slope (taper portion).

Further, in this embodiment, the first and second torque generating portions are respectively arranged in the hinge portions as a support mechanism at one end and the other end of the display 3. Thus, the display device can be made compact.

Further, in this embodiment, each of the first and second torque generating portions has a fixing member and a rotating member, and a biasing member for biasing the fixing member and the rotating member so as to be mutually pressed. The fixing member has a convex shape (a taper portion and a bank portion) according to the torque characteristics. Thus, the display device can be made compact. The convex shape is formed by the bank portion and the taper portion of the bracket in this embodiment. In this embodiment, the convex shape is formed on the fixing member side, but the convex shape may be also formed on the rotating member side.

Further, in this embodiment, the above fixing member is the bracket. Thus, the display device can be made compact. Further, in the above embodiment, the rotating member is a click washer, and the biasing member is a spring plate. As a modified example, the biasing member may be also integrated with the rotating member or the fixing member.

Further, in this embodiment, the display device 1 is constructed so as to be mounted to the ceiling of a vehicle. The display device 1 is constructed such that the screen of the display 3 is directed to the ceiling in the storing position, and the display 3 hangs down from the ceiling in the using position. Thus, in this embodiment, the display device 1 is a ceiling mounting type display device, and the dignity of the display device mounted to the ceiling can be improved.

Persons of ordinary skill in the art will realize that many modifications and variations of the above embodiments may be made without departing from the novel and advantageous features of the present invention. Accordingly, all such modifications and variations are intended to be included within the scope of the appended claims. The specification and examples are only exemplary. The following claims define the true scope and spirit of the invention.

What is claimed is:

1. A display device for use with a display, said display device comprising:
   first and second hinge portions coupled to said display and for rotatably supporting said display, said display being rotatable from a storing position to a using range by rotating said display over a passing range; and
   first and second torque generating portions provided on said first and second hinge portions respectively and for generating resistive torque for resisting the rotating movement of said display when said first and second hinge portions allow said display to rotate, the first torque generating portion generating a torque having a different range of values than a torque generated by the second torque generating portion when the display is rotated in the passing range.

2. The display device according to claim 1, wherein:
   said first torque generating portion has first torque characteristics for applying a first torque having a first torque level when said display is rotated over said passing range, said first torque generating portion continuing to apply said first torque having said first level when said display is rotated over said using range, and
   said second torque generating portion has second torque characteristics for applying a torque having an increasingly greater torque level when said display is rotated over said passing range to reach a second torque having a maximum torque level at said using range.

3. The display device according to claim 1, wherein said first and second torque generating portions are respectively attached to said display at opposite ends.

4. The display device according to claim 1, wherein each of said first and second torque generating portions has a fixing member and a rotating member relatively rotated as said display is rotated, and also has a biasing member for biasing said fixing member and said rotating member so as to be mutually pressed, and said fixing member or said rotating member has a convex portion having a convex shape according to said torque characteristics, and wherein said fixing member, said rotating member and said biasing member are arranged such that, when said biasing member biases said fixing member and said rotating member so as to be mutually pressed, said convex portion is pressed to said fixing member or said rotating member to generate frictional resistive torque between said fixing member and said rotating member depending on said convex shape.

5. The display device according to claim 4, wherein said fixing member is a bracket for supporting a rotating shaft coupled to said display.

6. The display device according to claim 1, said display device included in a ceiling mounting type display device and mounted to a ceiling.

* * * * *